Oct. 23, 1928.  1,688,752
C. SCHRAMM
THREADING MACHINE
Filed July 31, 1924    8 Sheets-Sheet 3

INVENTOR
Carl Schramm
BY Wayne B Wells
ATTORNEY

Oct. 23, 1928.

C. SCHRAMM 1,688,752

THREADING MACHINE

Filed July 31, 1924    8 Sheets-Sheet 4

Fig. 5.

INVENTOR.
Carl Schramm
BY Wayne B Wells
ATTORNEY.

Oct. 23, 1928.

C. SCHRAMM 1,688,752

THREADING MACHINE

Filed July 31, 1924     8 Sheets-Sheet 6

Fig. 8.

INVENTOR
Carl Schramm
BY Wayne B Wells
ATTORNEY

Oct. 23, 1928.

C. SCHRAMM

1,688,752

THREADING MACHINE

Filed July 31, 1924      8 Sheets-Sheet 7

INVENTOR.
Carl Schramm.
BY Wayne B Wells
ATTORNEY.

Patented Oct. 23, 1928.

1,688,752

UNITED STATES PATENT OFFICE.

CARL SCHRAMM, OF WEST HARTFORD, CONNECTICUT, ASSIGNOR TO PRATT & WHITNEY COMPANY, OF NEW YORK, N. Y., A CORPORATION OF NEW JERSEY.

THREADING MACHINE.

Application filed July 31, 1924. Serial No. 729,414.

My invention relates to threading machines and particularly to machines for forming threads on taps requiring no relief.

One object of my invention is to provide a new and an improved automatic threading machine that shall be provided with a loading and an unloading station, two roughing stations, and two finishing stations.

Another object of my invention is to provide a threading machine that shall automatically load and unload blanks in an improved manner and that shall be provided with new and improved means for moving the cutting members into and out of engagement with the blanks.

The machine disclosed in this application is in many respects similar to the machine disclosed in the patent to Müller, No. 1,347,788, dated July 27, 1920. The present machine is adapted to form threads on larger sized taps, is provided with more positive means for locking the chaser members in the cutting position, and is provided with two finishing and two roughing stations.

In a machine constructed in accordance with my invention, a turret is provided having six blank carrying spindles which are successively moved into operative relation to six operating stations. The six stations comprise loading and unloading stations, two roughing stations and two finishing stations. At the loading station, means is provided for loading blanks from a hopper into the spindles carried by the turret. At the roughing stations, chaser members are provided for roughly cutting the threads on the taps. At the two finishing stations, chaser members are provided for finishing the threads which have been cut at the roughing stations. At the two finishing stations, means is provided for forming a slight taper on the thread. A taper on the threads is necessary or desirable in taps which are not provided with relief. At the unloading station, the finished taps are ejected from the turret, The turret is indexed in timed relation to the operating means at the various stations. At the end of each cutting operation, the chaser members at each of the four cutting stations are moved out of engagement with the blanks in a direction perpendicular to the blank axis. At the end of each return movement of the carriage supporting the chaser members, the chaser members at the four cutting stations are moved into operative position with respect to the blanks in the blank carrying spindles. The means for moving the chaser members out of and into operative relation to the blanks is so operated as to maintain a force on the mechanism in one direction at all times in order to take up any back lash. The lead screw, which effects movement of the carriage carrying the various chaser members, is located centrally with respect to such carriage and thus insures a more even movement of the carriage. It has been discovered in practice that if the lead screw is located to one side of the die carrying carriage, a twisting action is effected which distorts the thread being cut on the blanks.

Figures 1, 2:
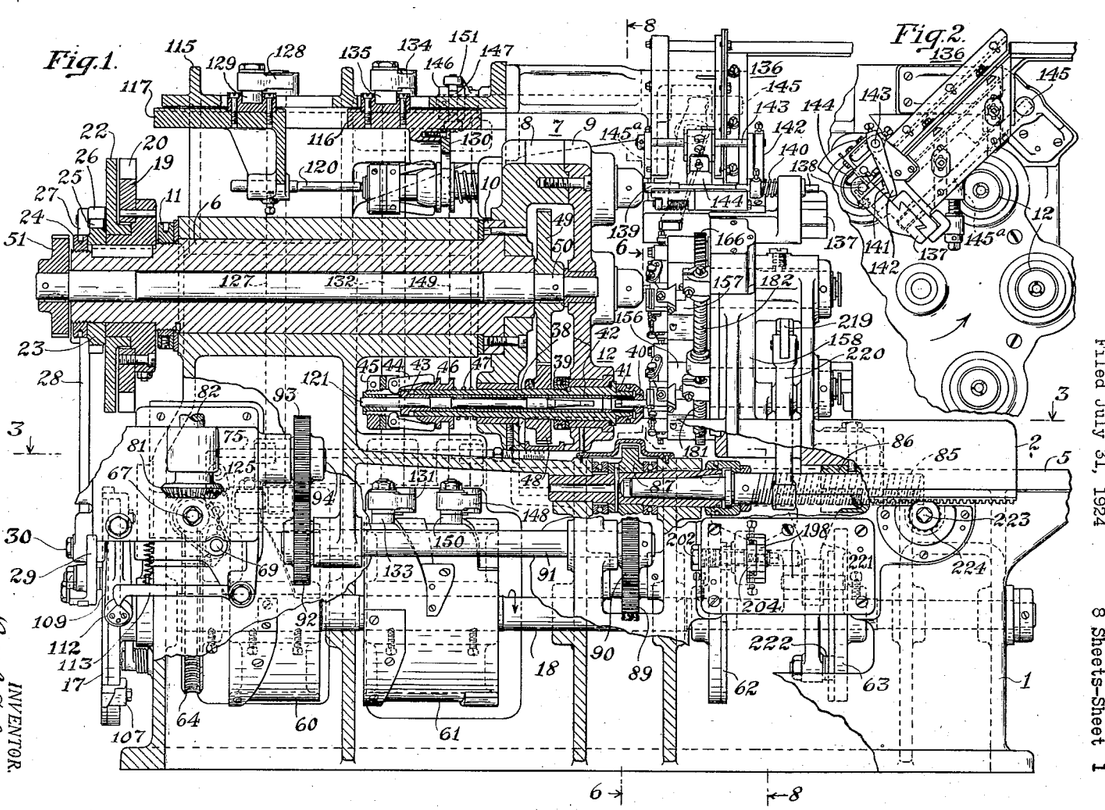
Figure 1 is a side elevational view, partially in section, of a machine constructed in accordance with my invention.
Fig. 2 is a detail view of the hopper mechanism.
Figure 6:
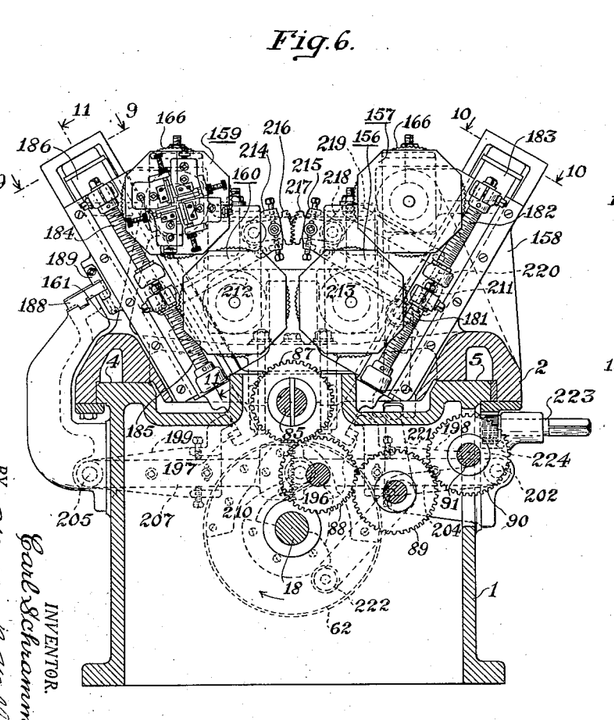
Fig. 6 is a section along the line 6—6 of Fig. 1.
Figure 8:
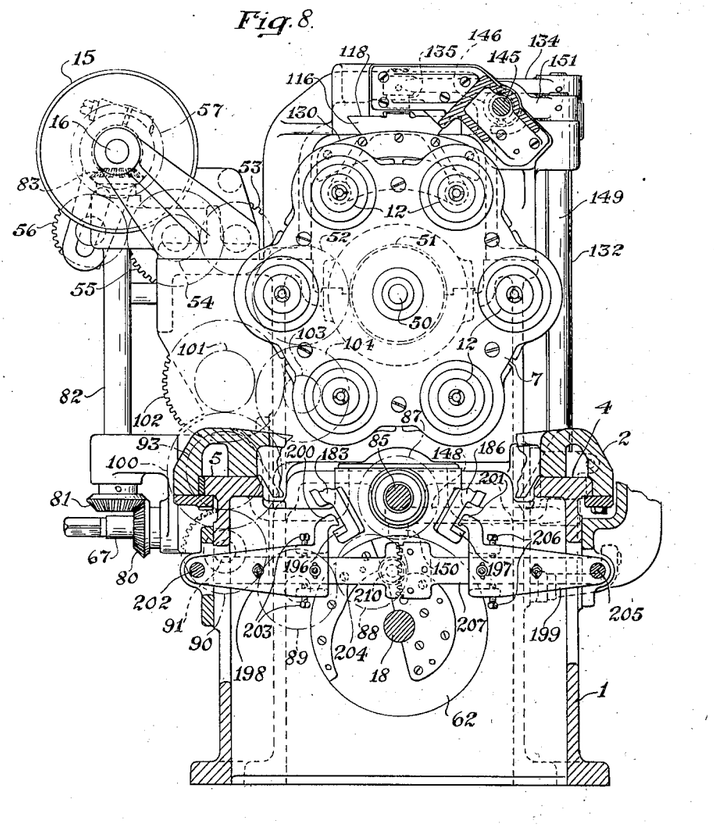
Fig. 8 is a sectional view along the line 8—8 of Fig. 1.
Figure 9:
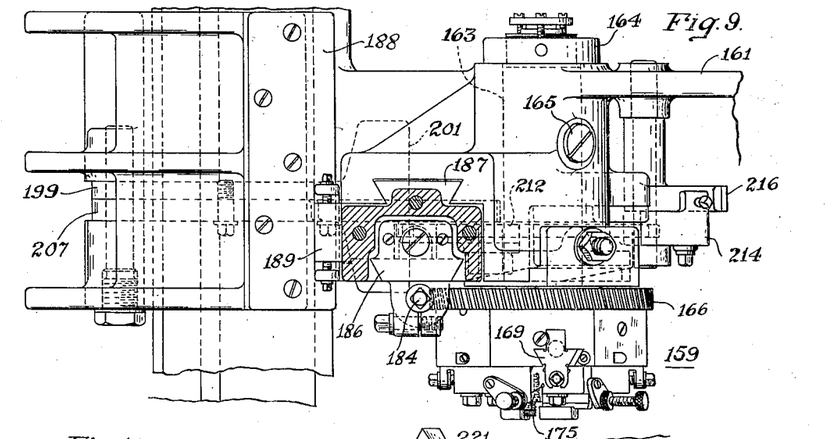
Fig. 9 is a sectional view along the line 9—9 of Fig. 6.
Figure 10:
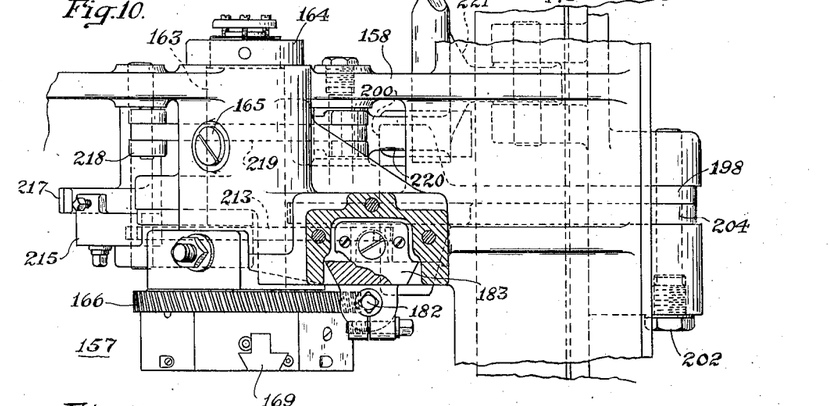
Fig. 10 is a sectional view along the line 10—10 of Fig. 6.

Referring to the accompanying drawings; a machine is illustrated comprising a bed or main frame 1 having a carriage 2 mounted thereon. The carriage 2 is suitably supported on guideways 4 and 5, as shown in Figs. 6 and 8 of the drawings. A turret spindle 6 is mounted in the frame 1 and carries a work carrying turret 7 (Fig. 1). The turret 7 comprises a turret frame 8, which is directly secured to the spindle 6, and a turret cap 9 which is secured to the frame 8. The spindle 6 is held in position in the main frame 1 by means of a collar 10 and a nut 11. The turret 7 carries six work carrying spindles 12 which are indexed through the various operating stations. At one station blanks are inserted successively into the work carrying spindles. At the next two stations roughing cuts are successively taken on the blanks. At the fourth and fifth stations finishing cuts are taken on the blanks and at the sixth station the blanks are ejected from the work carrying spindles.

The turret 7 is indexed in a manner similar to the indexing of the turret disclosed in my Patent No. 1,622,678 granted March 29, 1927. Power for rotating the indexing mechanism as well as for operating the machine is supplied to a pulley 15 which is mounted on a shaft 16. The indexing mechanism is operated by means of a cam disc 17 which is mounted on the end of a cam shaft 18. The indexing mechanism comprises a locking plate 19 which is suitably secured to the turret spindle 6. A number of notches 20, which fit a locking plunger 21, are formed in the periphery of the plate 19. An indexing disc 22 is rotatably mounted on the turret spindle 6 adjacent to the locking plate 19. Adjacent to the indexing disc 22 is mounted a ratchet wheel 23. The ratchet wheel 23 is provided with teeth corresponding in number to the number of operating stations on the machine. The ratchet wheel is keyed to the spindle 6 and is held in position by a nut 24. A pawl member 25 is pivotally mounted on a pawl support 27 and is held in engagement with the ratchet wheel 23 by means of a spring member 26. The pawl support 27 is connected by a link 28 to an operating lever 29. The operating lever 29 is pivotally mounted at 30 on the main frame of the machine and carries a roller 31 which is fitted to a cam groove 32 formed in the cam disc 17.

Figure 5:
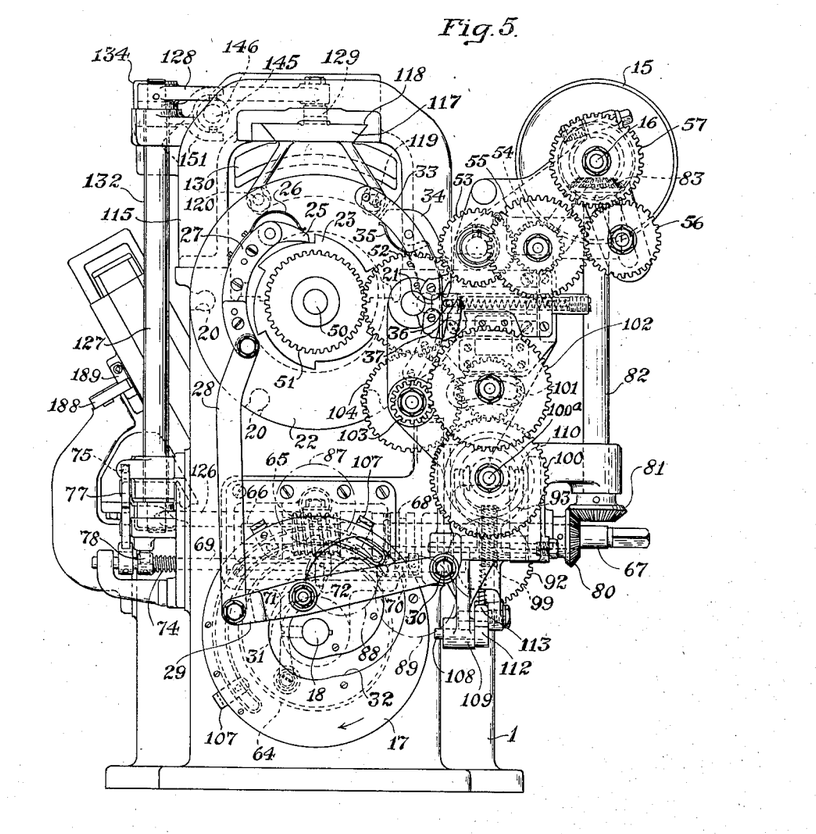
Fig. 5 is an end view of the machine showing the indexing mechanism.

A latch holder 33 is provided with a latch 34 to control the movement of the locking plunger 21 in accordance with the indexing of the turret. The latch member 34, which is pivotally supported on the index disc 22 by means of the latch holder 33, is forced by a spring member 35 into position to engage a pin 36 on the plunger 21. Thus, when the disc 22 is moved in a clockwise direction, as shown in Fig. 5 of the drawings, the latch member 34 engages the pin 36 to withdraw the plunger 21 from a notch 20 in the locking plate 19. The withdrawal of the plunger 21 is effected just prior to the engagement of the pawl 25 with a tooth on the ratchet wheel 33.

At the end of an indexing movement and when the disc 22 is being moved in a counter-clockwise direction, as shown in Fig. 5 of the drawings, a plunger locking cam 37, which is secured to the indexing disc 22, engages the plunger pin 36 not only to insure the movement of the locking plunger into a notch 20 in the plate 19, but also to lock the plunger in such position.

The indexing of the turret is controlled directly by the cam groove 32 formed in the cam disc 17. The lever 29 and the link 28 compel movement of the indexing disc 22 directly in accordance with the shape of such groove. Movement of the indexing disc 22 in a clockwise direction, as shown in Fig. 5 of the drawings, compels the pawl 25 to engage a ratchet tooth and effect rotation of the turret spindle in a clockwise direction. Just prior to the engaging of the pawl 25 with the ratchet tooth, the locking plunger 21 is withdrawn from engagement with the locking plate 19 by means of the latch member 34. At the end of an indexing movement, the indexing disc 22 is rotated in a counter-clockwise direction to position the pawl 25 adjacent another tooth on the ratchet wheel 23 and also to lock the turret spindle 6 in an indexed position. The turret spindle is locked by the plunger 21 engaging a notch 20 in the locking plate 19. For a more complete description of the indexing mechanism, reference may be had to my above mentioned patent.

The six blank carrying spindles 12, which are mounted in the turret 7, are similar in construction and operation and accordingly only one spindle will be described in detail. Referring particularly to Fig. 1 of the drawings, each blank carrying spindle comprises a spindle sleeve 38 which is supported by bushings in the turret frame 8 and in the turret cap 9. A nut 39, which is threaded to the sleeve 38, is provided adjacent to the turret cap 9 for cooperating with a collar on the sleeve to prevent any longitudinal movement of the sleeve through the turret. A chuck member 40, which cooperates with a nut 41 for engaging and holding a blank in position, is mounted in one end of the spindle sleeve 38. The chuck member 40 is engaged by a tube 42 which is mounted in the spindle sleeve 38. The end of the tube 42 is provided with a collar 43 which is adapted to be engaged by two levers 44. The levers 44 are pivotally mounted on a collar member 45 which is secured to the end of the spindle sleeve 38. The levers 44 are operated by a collar 46 to effect movement of the tube 42 in the spindle sleeve for opening and closing the chuck 40. The collar 46 is slidably mounted on the spindle sleeve 38 and is normally moved towards the left, as shown in Fig. 1, by means of a spring member 47. The collar 46 is controlled by the cam shaft 18 in a manner to be hereinafter set forth.

A gear wheel 48 is fixedly connected to each spindle sleeve 38 between the turret frame 8 and the turret cap 9. Such gear wheels 48 mesh with a gear wheel 49 which is mounted on a turret shaft 50. The turret shaft 50 projects through the turret spindle 6 and carries a second gear wheel 51. The gear wheel 51 is connected through gear wheels 52 to 56, inclusive, to gear wheel 57 on the shaft 16 which carries the pulley 15. By such means the work carrying spindles 12 are rotated at all times.

Figure 3:
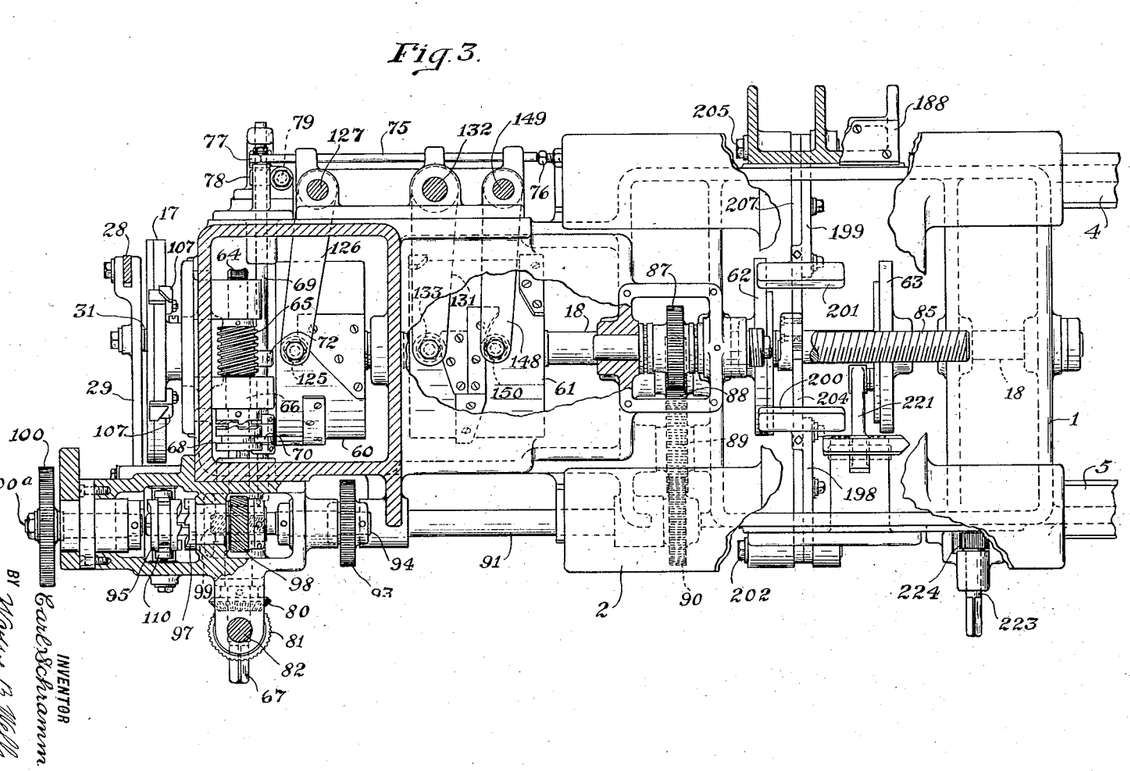
Fig. 3 is a plan view in section along the line 3—3 of Fig. 1.

The cam shaft 18, which carries the cam disc 17 for effecting the indexing operation, also carries a cam drum 60 for controlling the ejection of the finished blanks from the turret. A cam drum 61 is mounted on the shaft 18 for not only controlling the opening and the closing of the chucks 40, but also for controlling the loading of the blanks in the turret. A cam disc 62 is mounted on the shaft 18 for controlling the closing of the operating dies and a cam disc 63 is mounted on the shaft 18 for controlling the opening of the operating dies in a manner to be hereinafter set forth. A worm wheel 64, which is mounted on the shaft 18 between the disc 17 and the cam drum 60, meshes with a worm 65. The worm 65 is carried by a shaft 66. The shaft 66, as shown in Figs. 3 and 5 of the drawings, is connected to a shaft 67 by means of a clutch 68. The clutch 68 is controlled by means of a rod 69 which is disposed parallel to and below the shaft 66. The rod 69 carries a yoke member 70, which is fitted to a groove formed on the clutch 68. Movement of the rod 69 towards the right, as shown in Fig. 5 of the drawings, serves to open the clutch 68 and disconnect the shaft 66 from the shaft 67. Movement of the clutch 68 in an opposite direction serves to connect the shafts 66 and 67 and to effect rotation of the shaft 18 in a manner to be hereinafter set forth.

The rod 69 is moved towards the right, as shown in Fig. 5 of the drawings, by means of a pin 71 which is mounted on the worm wheel 64. The pin 71, when the worm wheel 64 is moved in a clockwise direction as shown in Fig. 5 of the drawings, engages a lug or collar 72 which is secured to the shaft 69. The pin 71 engaging the collar 72 in the rod 69 serves to stop the rotation of the cam shaft 18.

Figure 4:
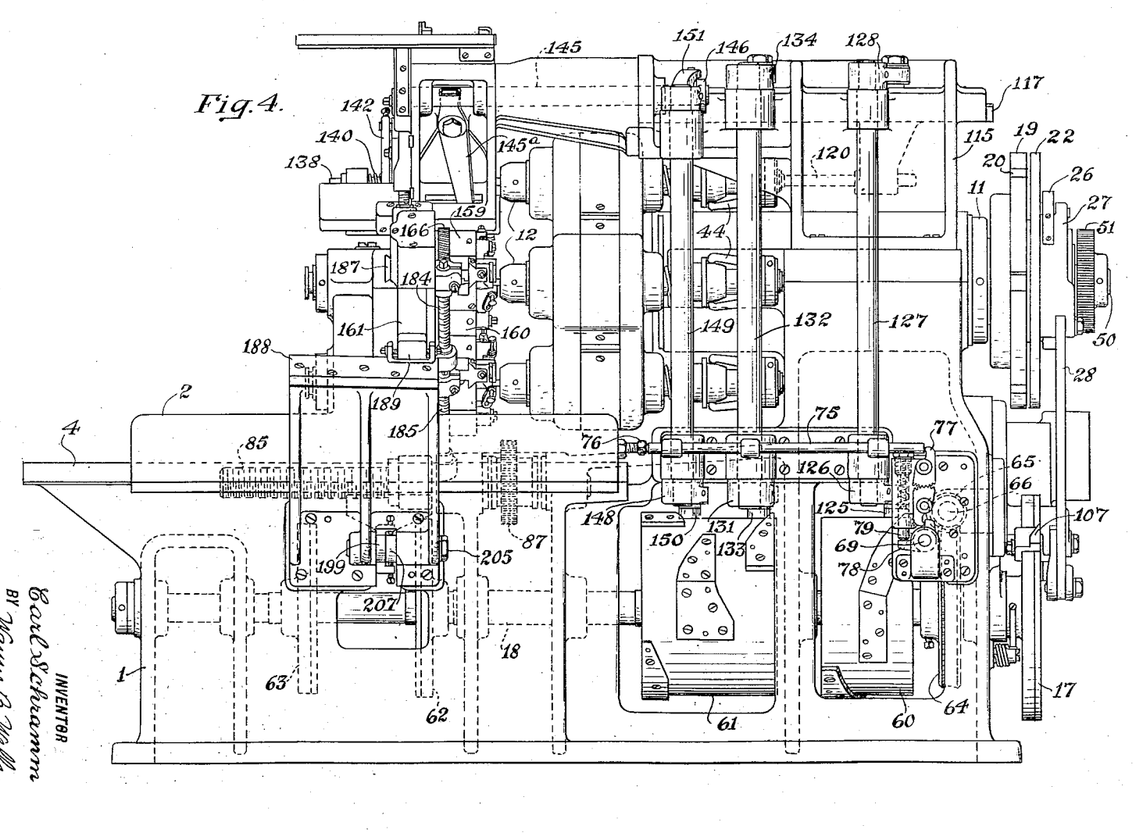
Fig. 4 is a rear elevational view of the machine.

The rod 69 is operated to close the clutch 68 in accordance with the movement of the die carrying carriage 2. In order to close the clutch 68, the rod 69 is given a movement of rotation to separate the collar 72 from the pin 71. Upon separation of the pin from the collar, a spring member 74 moves the rod 69 towards the right, as shown in Fig. 5 of the drawings. The movement of rotation of the rod 69 is effected by means of a rod 75 which is best shown in Fig. 4 of the drawings. The rod 75 is slidably mounted on the main frame of the machine and is engaged by an adjustable bolt 76 on the carriage 2. One end of the rod 75 engages the end of a gear segment 77. The gear segment 77 meshes with a second gear segment which directly operates the rod 69 through a bell crank lever 78. The bell crank lever 78, which is fixedly secured to the rod 69, is engaged by a spring pressed plunger 79. The plunger 79 serves to hold the rod 75 firmly in engagement with the bolt 76 secured to the carriage 2. Thus, the rotation of the cam shaft 18 is initiated by the carriage 2 engaging the rod 75 and the rotation of such cam shaft is stopped by the pin 71 on the worm wheel 64 engaging a collar 72 on the rod 69.

The shaft 67, which is connected to the shaft 66 by the clutch 68, carries a bevel gear wheel 80. The gear wheel 80 meshes with a bevel gear wheel 81 on a vertical shaft 82. The shaft 82 carries a bevel gear wheel 83 which meshes with a bevel gear wheel 84 on the pulley shaft 16.

The die carrying carriage 2 is moved in one direction by means of power supplied from the shaft 67 and is moved in an opposite direction by power supplied directly from the pulley shaft 16. When the carriage 2 is moved towards the right, as shown in Fig. 4 of the drawings and is effecting a cutting stroke, the carriage is operated by power supplied directly from the shaft 16 in order to effect movement directly in accordance with the rotation of the spindles on the turret 7. A lead screw 85 (Figs. 1, 3 and 4), which is suitably mounted in the main frame of the machine centrally with respect to the carriage 2, engages a nut 86 on the carriage 2. A gear wheel 87, which is secured to the lead screw 85 is connected through gear wheels 88 and 89 to a gear wheel 90 on a shaft 91. The shaft 91 carries a second gear wheel 92 which meshes with a gear wheel 93 on a short shaft 94. The shaft 94 has a clutch member 95 splined thereto and rotatably carries a sleeve member 97. The sleeve member 97 carries a spiral gear wheel 98 which meshes with a spiral gear wheel 99 on shaft 67. The clutch member 95 is moved in one direction to engage clutch teeth on the sleeve 97 and thus connect the sleeve 97 and the spiral gear wheel 98 to the shaft 94. A short shaft 100$^a$, which is aligned with the shaft 94, carries clutch teeth on a collar for engaging the clutch teeth on the clutch member 95. The short shaft 100$^a$ carries a gear wheel 100 which is connected through gear wheels 101, 102, 103, 104, 52, 53, 54, 55 and 56 to the gear wheel 57 on the pulley shaft 16. It will be noted upon referring to Fig. 5 of the drawings that the gear wheels 57, 56, 55, 54, 53 and 52 are not only in the train of gears which rotate the blank carrying spindles 12 but also are in the train of gears which operate the lead screw 85 for effecting movement of the carriage 2 in a cutting direction.

The clutch member 95 (Fig. 3) connects the shaft 100ª to the shaft 94 when the lead screw 85 is operated in a direction to effect a cutting operation and connects the sleeve 97 to the shaft 94 when the lead screw is operated to effect a return movement of the carriage 2. The spiral gear wheel 98 on the sleeve 97, as heretofore set forth, meshes with a spiral gear wheel 99 on the shaft 67. The shaft 67 is connected to the pulley shaft 16 through the vertical shaft 82 and bevel gear wheels 80, 81, 83 and 84.

The clutch member 95 is controlled by means of dogs 107 which are mounted on the cam discs 17. The cam disc 17, as heretofore set forth, controls the indexing of the turret 7. The dogs 107 engage a pin 108 on a lever 109 for controlling the clutch member 95. A bifurcated end portion 110 of the lever 109 is fitted to a groove in the clutch member 95, as shown in Figs. 1, 3, 5 and 7 of the drawings. A notched plate 112, which is secured to the lever 109, is engaged by a spring pressed lever 113 in order to accentuate the operative positions of the clutch member 95.

A bracket 115, which is mounted on the main frame of the machine, supports the chuck opening slide 116 and stop slide 117. The two slides 116 and 117 are mounted in the same guideway 118 in the bracket 115. The slide 117 carries a stop rod 119 and a push-out rod 120. The two rods 119 and 120 are adjustably mounted in the slide 117 and are aligned with the two blank carrying spindles 12 at the loading and the unloading stations. Each of the blank carrying spindles is provided with a rod 121 which is movable through the tube 42. Thus, it is apparent movement of the slide 117 causes the rod 119 to engage one of the rods 121 to limit the movement of a blank being loaded in the chuck at the loading station and the rod 120 engages a rod 121 for pushing out the finished blank at the unloading station. The slide 117 is operated by a cam groove which is formed on the cam drum 60. A roller 125, which is mounted on a lever 126, is fitted to the cam groove on the drum 60. The lever 126 is fixedly mounted on a vertical shaft 127. The shaft 127 carries a second lever 128 near the upper end thereof. The lever 128 carries a roller 129 which is fitted to a block mounted on the slide 117. By such means, the slide 117 is operated in accordance with the cam groove formed on the cam drum 60.

The chuck opening slide 116 carries a plate 130 which engage a groove formed in each of the collars 46 on the work carrying spindles located at the loading and at the unloading stations. The plate 130 operates the two collars 46 which in turn, through the levers 44, operate the two chucks at the loading and the unloading stations. The opening of the chucks permits the pushing out of the finished blank at the unloading station and the inserting of a new blank in the work carrying spindle at the loading station. The slide 116 is operated in accordance with the shape of a cam groove which is formed on the cam drum 61. A lever 131, which is fixedly mounted on a vertical shaft 132, carries a roller 133. The roller 133 is fitted to the cam groove formed on the drum 61. The vertical shaft 132 carries a second lever 134 near the upper end thereof. The lever 134 is provided with a roller 135 which is fitted to a block secured to the slide 116. Thus, the slide 116 is operated in accordance with the cam groove which is formed on the drum 61.

A hopper mechanism 136 is provided for supplying blanks to be inserted in the work carrying spindle at the loading station. Such hopper mechanism is similar in many respects to the hopper mechanism described in the above-mentioned patent to Müller No. 1,347,788 and accordingly a detailed description of such mechanism is deemed unnecessary. A loading slide 137 (Figs. 1 and 2) carries a rod 138 which is adapted to engage a blank 139 in the hopper mechanism and move such blank into the chuck at the loading station. The rod 138 has a limited longitudinal movement in the slide 137 and is held in an extreme position towards the blank 139 by means of a spring 140. The slide 137 carries a cam member 141 which operates an arm 142 in accordance with the movement of the slide. The arm 142 is secured to a rock shaft 143 which carries a finger 144 for holding blanks in the hopper mechanism out of alignment with the rod 138. The cam member 141 operates the finger 144 at each movement of the slide 137 to allow one blank to fall into position to be engaged by the rod 138. The slide 137 is operated by a lever 145ª which is connected to a rod 145. The rod 145 is provided with a collar 146 having a groove 147 formed therein, as best shown in Figs. 1 and 5 of the drawings. The rod 145 is operated in accordance with the shape of a second cam groove which is formed on the cam drum 61. A lever 148, which is mounted on a vertical shaft 149, carries a roller 150. The roller 150 is fitted to the second cam groove in the cam drum 61. The vertical shaft 149 carries a yoke member 151 which is fitted to the groove 147 in the collar 146 on the shaft 145. Thus, the shaft 145 and the slide 137 are operated in accordance with the shape of the second cam groove on the cam drum 61.

Figures 12, 13, 14, 15:
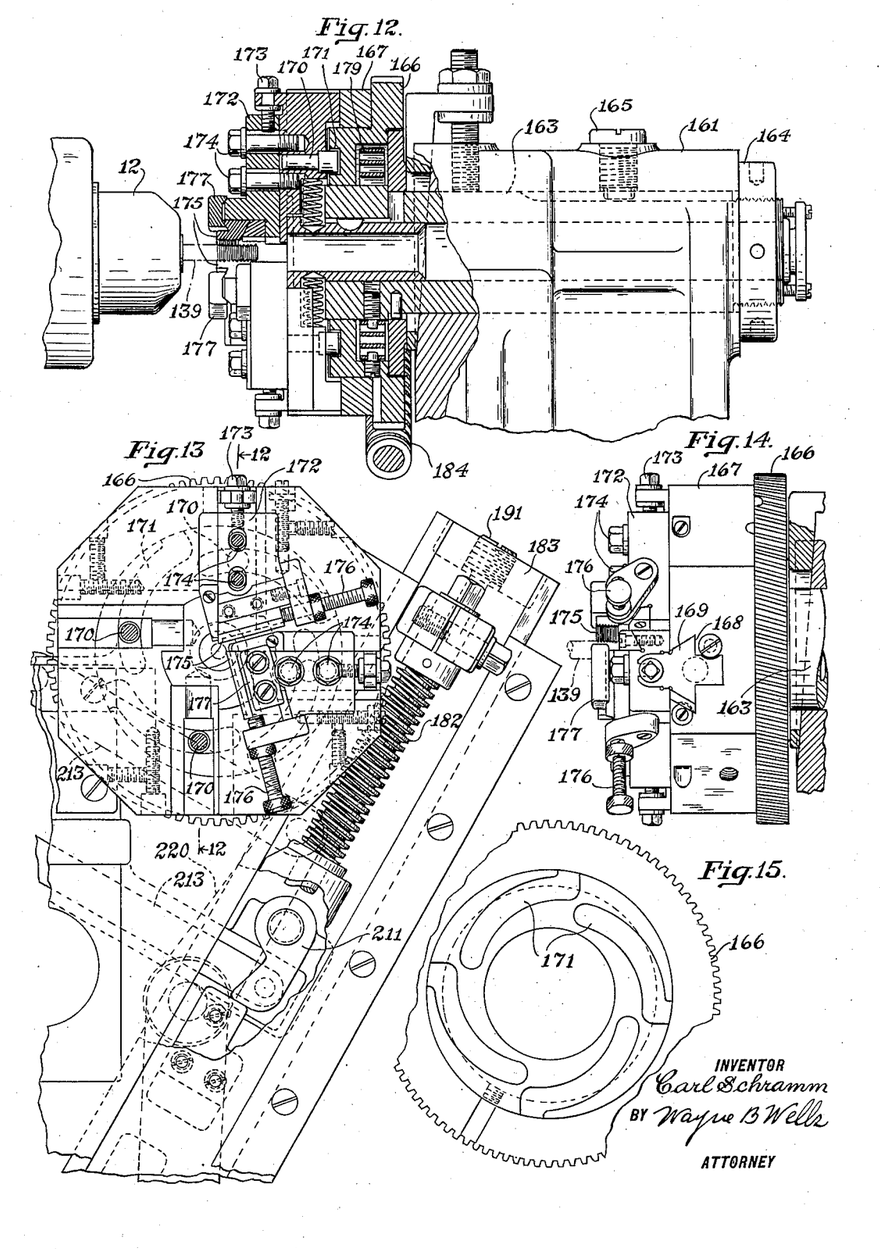
Fig. 12 is a sectional view along the line 12—12 of Fig. 13.
Fig. 13 is a front view of a die head.
Fig. 14 is a side view of the die head shown in Fig. 13.
Fig. 15 is a view of the adjusting member shown in Fig. 14.

Two roughing die heads 156 and 157 are mounted on a bracket 158 which projects from the carriage 2 and two finishing die heads 159 and 160 are mounted on a bracket 161 which projects from the carriage 2. The four die heads 156, 157, 159 and 160 are similar in construction and operation and accordingly a description of only one of such die heads, namely the die head 159, will be given in detail. A trunnion 163 is mounted in the bracket 161 and is held against longitudinal movement by means of a nut 164. The trunnion is held against rotation by means of a set screw 165 and carries an adjusting worm wheel 166. The worm wheel 166, which is rotatably mounted on the trunnion, carries a plate 167. The plate 167 is provided with a number of guideways 168 for carrying die carrying slides 169. In the drawings, four of such die carrying slides have been illustrated, but it is to be understood that any suitable number of such slides may be carried by the plate 167. A stud 170, which is secured to each slide, engages one of the cam slots 171. The cam slots 171 are formed in the worm wheel 166, as indicated in Fig. 15 of the drawings. The movement of the worm wheel 166 thus serves to operate the slides 169 through the bolts 170. Each slide 169 carries a block 172 which may be adjusted by means of a set screw 173, as indicated in Fig. 12 of the drawings. The block 172 is secured to the slide 169 in any set position by means of bolts 174. Chaser members 175 are adjusted in the block 172 by means of set screws 176. Such chaser members are held in adjusted position by means of clamps 177 which are suitably secured to the block 172. The set screws 173 and 176 thus serve to adjust the position of the chaser members 175 with respect to the blank being operated on. The worm wheel 166 and the bolts 170, which are fitted to the slots 171, serve to move the die member 175 away from the blank in a direction perpendicular to the blank axis at the end of a cutting operation and to move the die members toward the blank in a direction perpendicular to the blank axis prior to the beginning of a cutting operation. A spiral spring member 179, which is located in an orifice formed in the worm wheel 166, is connected between such worm wheel and the trunnion 163. The spring member serves to exert a force tending to move the worm wheel in one direction.

The worm wheel 166 on the die heads 156 and 157 are respectively operated by means of worm shafts 181 and 182 which are mounted on a slide 183. The worm wheels 166 on the die heads 159 and 160 are respectively operated by worm shafts 184 and 185 which are mounted on a slide 186. The worm shafts 184 and 185 on the slide 186 and the worm shafts 181 and 182 on the slide 183 may be rotated for preliminarily adjusting the position of the chaser dies on the die heads. The slides 186 and 183 are automatically operated in accordance with the operation of the machine to open and close the die heads. At the end of a cutting operation, the chaser dies are moved away from the blank in a direction perpendicular to the blank axis. After the die heads have been moved longitudinally away from the blank, the chaser dies are moved in a direction perpendicular to the blank axis into operative position.

The slide 186, which carries the worm shafts 184 and 185, is mounted on a second slide 187. A taper adjusting plate 188 projects from a bracket on the main frame of the machine, as shown in Fig. 6 of the drawings. The plate 188 is fitted to notch in a block 189 which projects from the slide 187. The plate 188 may be adjusted to any desired angle with respect to the direction of movement of the carriage 2. The plate 188 serves to operate the worm shafts 184 and 185 so as to taper the threads being formed on the blanks. A taper is desirable on taps which are formed without any relief. Only the finishing die heads 159 and 160 are operated to form a taper on the blank threads. It is deemed unnecessary to operate the roughing dies 156 and 157 in such manner.

Figure 11:
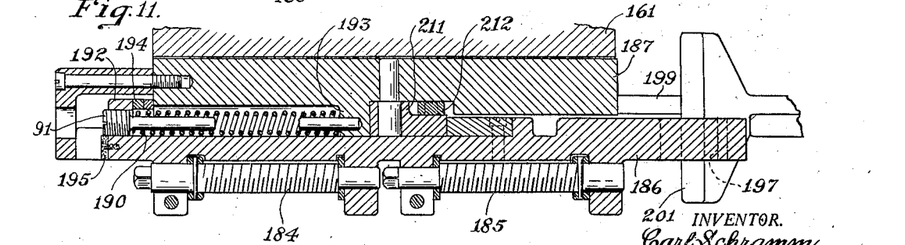
Fig. 11 is a sectional view along the line 11—11 of Fig. 6.

A spring member 190, as shown in Fig. 11 of the drawings, is provided between slide 187 and the slide 186 for exerting a force tending to move the slide 186 in a direction to move the chaser dies away from the blank being operated on. The spring member 190 is mounted on a bolt 191 between a lug 192 projecting from the slide 186 and a lug 193 projecting from the slide 187. Suitable washers 194 are provided for cushioning the engagement between the lug 192 and the top of the slide 187 and a washer 195 is provided for cushioning the engagement between a projection from the slide 187 and the top of the slide 186.

The lower portions of slides 183 and 186 are provided with catches 196 and 197. Two levers 198 and 199, which are respectively provided with latch portions 200 and 201, are adapted to engage the catches 196 and 197 on the slides 183 and 186. The lever 198, which is pivotally mounted on a bolt 202, is provided with a yoke portion having a set screw 203 therein. The screw 203 engages a second lever 204 which is pivoted on the bolt 202. The lever 199, which is pivotally mounted on a bolt 205, is provided with a yoke portion having screws 206 therein. The screws 206 engage a lever 207 which is also pivotally mounted on the bolt 205. The two levers 204 and 207 have meshing gear segments formed thereon to compel corresponding movements by the two levers. The lever 204 carries a roller 210 which is fitted to a cam groove formed on the cam disc 62. Thus, the levers 207 and 204 are moved in accordance with the shape of the cam groove on the disc 62. Such movements of the levers in turn are transmitted to the slides 186 and 183. The disc 62 and the levers controlled thereby serve to move the chaser dies perpendicularly towards the blank axis to very nearly the operative position of the dies. Thus at the end of the return movement of the carriage 2, the cam disc 62 so operates the levers 207, 199, 204 and 198 as to compel the latches 200 and 201 to engage the catches 196 and 197 and move the slides 183 and 186 downwardly in opposition to the spring members 190.

Associated with each slide 186 and 183 is a cam member 211 which not only moves the slides 186 and 183 downwardly to place the chaser dies in exactly the operative position but also locks the chaser dies in operative position. In Fig. 11, the cam member 211 is shown pivotally mounted on the slide 187. It is to be understood that the cam member 211, which operates on the slide 183, is directly mounted on the bracket supporting such slide. As heretofore set forth no slide corresponding to the slide 187 is provided for the roughing dies. The cam members 211 are respectively connected by links 212 and 213 to pivotally mounted yoke members 214 and 215, as shown in Fig. 6 of the drawings. The yoke members are provided with set screws which engage pivotally mounted gear segments 216 and 217. The gear segment 217 is provided with an arm 218 which is connected by a link 219 to a bell crank lever 220. The bell crank lever 220 in turn is connected to a second bell crank lever 221. The bell crank lever 221 carries a roller 222 which is fitted to a cam groove formed in the cam disk 63. Accordingly, it is apparent the cam members 211 are operated in accordance with the shape of the cam groove which is formed on the cam disc 63.

When the cam disc 62 operating through the levers 204 and 207 moves the slides 186 and 183 downwardly to a predetermined point, the cam disc 63 operates the bell crank lever 221 which in turn operates the bell crank lever 220. The bell crank lever 220, through the gear segments 216 and 217, simultaneously operates the two cam members 211 not only for moving the slides 186 and 183 to place the chaser members in operative position but also to lock the slides and the chaser members in operative position. At the end of the cutting stroke by the carriage 2, the cam disc 63 operates cam members 211 to release the slides 186 and 183 and permit the spring members 190 to move the chaser members away from the blanks. In the above operation, it will be noted pressure is maintained on the slides 186 and 183 in one direction at all times to prevent any lost motion between such slides and the chaser members. The positive moving of the slides into operative position by the cam members 211 prevents any lost motion which is liable to be produced if the slides are moved beyond the operative position. This feature is of vital importance and unless such lost motion is taken care of, improper threads will be cut on the blanks.

Figure 7:
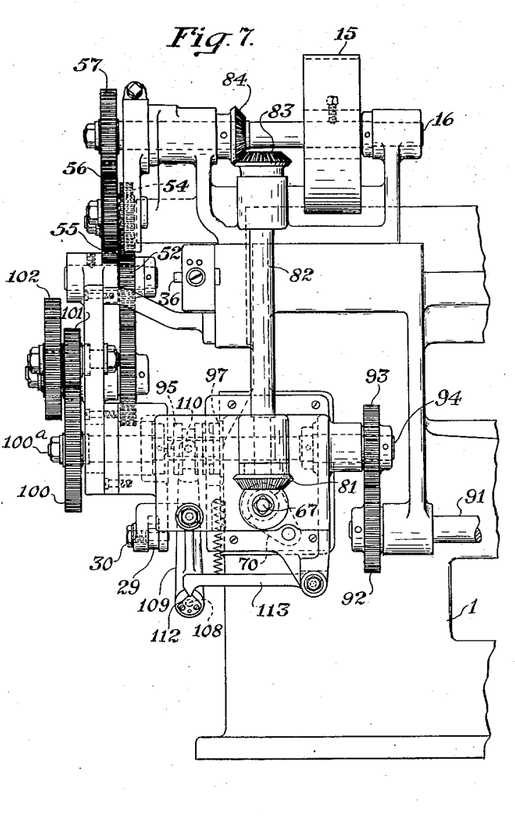
Fig. 7 is a partial side elevational view of the machine.

All preliminary adjustments of the carriage 2 may be made by means of a shaft 223. The shaft 223 carries a pinion 224 which engages rack teeth on the carriage 2. Assuming the carriage 2 to be at the end of a cutting stroke, the slide 116 is operated by a cam groove on the cam drum 61 for opening the chucks on the turret 7 which are located at the loading and unloading stations. The loading and the unloading stations are located at the top of the machine. Upon opening of the chucks, the slide 117 is operated by the cam groove on the cam drum 60, for ejecting the blank from the blank spindle at the unloading station and for positioning the rod 120 to limit the blank which is being inserted in the turret at the loading station. Simultaneously with the operation of the slide 117, the second cam groove on the drum 61 operates the slide 137 for inserting the blank into position in the turret. The cam disc 63 at such time is so operated as to move the cam members 211 out of engagement with the slides 186 and 183. The spring members 190 operate the slides 186 and 183 to effect movement of the chaser members away from the blanks. The clutch 95 which controls the direction of rotation of the carriage lead screw 85 is moved towards the right, as shown in Fig. 7 of the drawings, to operate the lead screw from the shaft 67. Accordingly the carriage 2 is moved towards the left, as shown in Fig. 4 of the drawings, to effect a return stroke. At the end of the return stroke, the clutch 95 is operated by the dogs 107 on the disc 17 to effect operation of the lead screw 85 directly from the power shaft 16. The direction of rotation of the lead screw is reversed to effect a cutting stroke by the carriage 2.

Prior to the return stroke of the carriage 2, the cam disc 62 operates to move the chaser member very near to operative position and the cam disc 63 operates to complete the movement of the chaser members to operative position and to lock such chaser members in operative position. The rotation of the cam shaft 18 which carries the various cam discs and cam drums is stopped by the pin 71 engaging the lug 72 on the rod 69. The rod 69, as heretofore set forth, opens the clutch 68 to prevent further rotation of the cam shaft. Near the end of the cutting stroke of the carriage 2, the rod 75 engaging the end of the gear segment 77 operates the rod 69 to close the clutch 68 and start the operation of the cam shaft 18. The cam shaft through the dogs 107 on the cam disc 17 reverses the position of the clutch 95 to effect a return stroke of the carriage 2. The above cycle of operations is repeated indefinitely.

Modifications in the machine and in the arrangement and location of parts may be made within the spirit and scope of my invention and such modifications are intended to be covered by the appended claims.

What I claim is:

1. In a threading machine, the combination with a blank carrying spindle, a plurality of chaser members for engaging the blank carried by said spindle, and means for effecting relative movement between the blank carrying spindle and the chaser members longitudinally with respect to the spindle, of resilient means exerting a force tending to move the chaser members away from the blank carried by the spindle in a direction perpendicular to the blank axis, automatic means for moving the chaser members towards the blank nearly to the operative position prior to a cutting operation, and cam locking means for forcing the chaser members into operative position to engage the blank and for holding the chaser members in such position.

2. In a threading machine, the combination with a blank carrying spindle, a plurality of chaser members for engaging the blank carried by said spindle, and means for effecting relative movement between the blank carrying spindle and the chaser members longitudinally with respect to the spindle, of resilient means exerting a force tending to move the chaser members away from the blank carried by the spindle in a direction perpendicular to the blank axis, automatic means for moving the chaser members towards the blank nearly to the operative position prior to a cutting operation, cam locking means for forcing the chaser members into operative position to engage the blanks and for holding the chaser members in such position, and automatic means for releasing said locking means at the end of a cutting operation to permit movement of the chaser members away from the blank.

3. In a threading machine, the combination with a blank carrying spindle, a set of chaser members for cutting threads on the blank carried by said spindle, and means for effecting relative movement between the spindle and the chaser member longitudinally with respect to the spindle to cut threads, of automatic means for moving the chaser members perpendicularly to the spindle axis to nearly the operative position prior to the cutting of the threads on the blank, cam locking means for moving the chaser members into operative position and for holding them in such position during the cutting operation, and means for moving the chaser members perpendicularly away from the blank at the end of the cutting operation upon release of said locking means, said means for constantly forcing the chaser members away from the blank serving to take up all lost motion.

4. In a threading machine, the combination with a blank carrying spindle, a set of chaser members for cutting threads on the blank carried by the spindle, means for effecting relative movement between the spindle and the chaser members longitudinally with respect to the spindle, and means for rotating the spindle in timed relation to the longitudinal movement between the spindle and the chaser members, of means for exerting a force tending to move the chaser members away from the blank carrying spindle in a direction perpendicular to the spindle axis, means for moving the chaser members perpendicularly to the spindle axis to nearly the operative position prior to the cutting operation, cam locking means for positively moving the chaser members into operative position to engage the blank at the beginning of the cutting operation and to hold the chaser members in operative position during the cutting operation, and means for releasing said cam locking means at the end of the cutting operation to move the chaser members away from the blank to permit relative movement of the blank and the chaser members to initial position without damage to the threads cut on the blank.

In testimony whereof, I hereto affix my signature.

CARL SCHRAMM.